F. G. SAYLOR.
VEHICLE TIRE.
APPLICATION FILED MAR. 6, 1917.
1,278,224.
Patented Sept. 10, 1918.
2 SHEETS—SHEET 1.
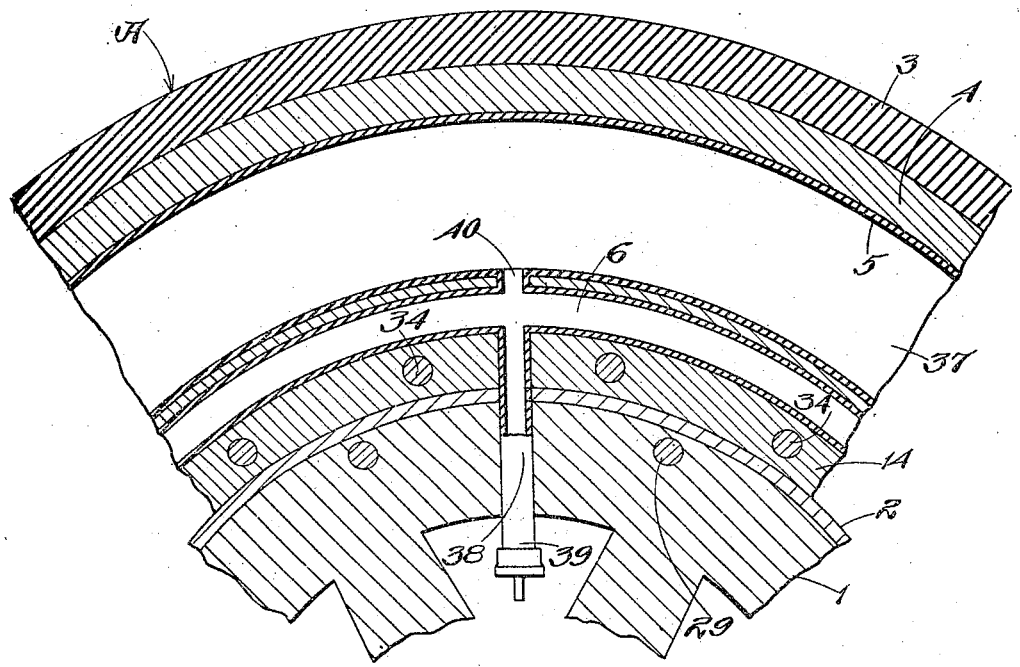
Fig. 1.
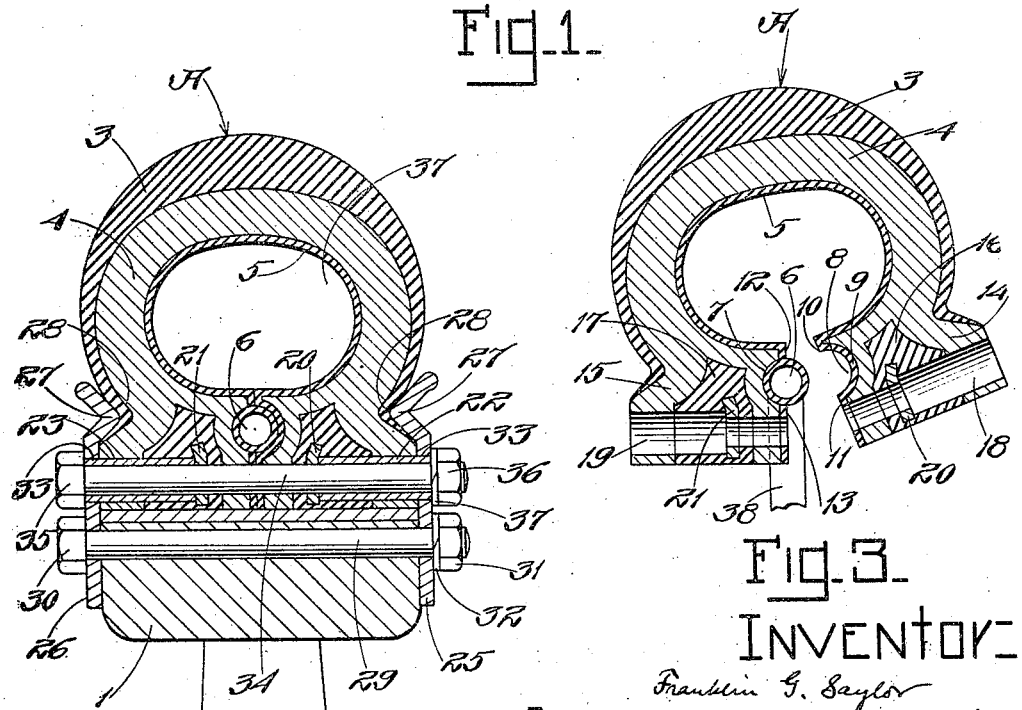
Fig. 2.
Fig. 3.
INVENTOR:
Franklin G. Saylor
by Macleod, Colver, Copeland
Attys.

F. G. SAYLOR.
VEHICLE TIRE.
APPLICATION FILED MAR. 6, 1917.

1,278,224.

Patented Sept. 10, 1918.
2 SHEETS—SHEET 2.

INVENTOR:
Franklin G. Saylor
by Macleod, Calver, Copeland & Dike
Attys.

UNITED STATES PATENT OFFICE.

FRANKLIN G. SAYLOR, OF QUINCY, MASSACHUSETTS, ASSIGNOR OF ONE-FOURTH TO GEORGE A. LUFKIN, OF REVERE, MASSACHUSETTS.

VEHICLE-TIRE.

1,278,224.

Specification of Letters Patent.   Patented Sept. 10, 1918.

Application filed March 6, 1917.   Serial No. 152,451.

*To all whom it may concern:*

Be it known that I, FRANKLIN G. SAYLOR, a citizen of the United States, residing at Quincy, county of Norfolk, State of Massachusetts, have invented a certain new and useful Improvement in Vehicle-Tires, of which the following is a specification, reference being had therein to the accompanying drawings.

The invention relates to an improvment in pneumatic inflatable tires for vehicles of various kinds, being especially intended for use on heavy vehicles of the automobile type and being especially valuable for use on commercial vehicles which carry heavy loads. The object of the invention is to provide a pneumatic inflatable tire which does not require the use of an inner tube, which is resilient yet will sustain great weight without breaking down, and which is detachable and is easily opened for the purpose of making repairs.

Solid rubber tires do not give enough resiliency for economic use on heavy or freight carrying automobiles. The suspended parts, the joints in the mechanism, and the engine are subjected to the severest kind of wear owing to the bounding motion over rough roads. The constant chattering causes the bolts to wear in such a way that they frequently drop out of place and the life of the suspended parts is very greatly shortened.

Solid rubber tires in use on trucks of the heavy type must be replaced, when worn out, at the factory, causing delay and additional expense. The wheels when equipped with the solid rubber tire weigh anywhere from 300 pounds to 1000 pounds, depending on the tonnage of the automobile. Under these conditions more power is required to run the car, which means more expense for fuel.

One feature of the invention consists in making the tire tubular but split on the inner periphery so that it can be opened up for access to the interior but provided with means whereby the split edges can be closed and sealed tightly together without adhesion, yet can be easily separated when desired without breaking or mutilating any of the parts and which can be closed and sealed together again by the use of the same mechanism, the tire also being constructed so that while it is sealed it can be readily inflated and the more it is inflated the more tightly it becomes sealed against leakage.

The invention will be fully understood when taken in connection with the accompanying drawings and the novel features thereof will be pointed out and clearly defined in the claims at the close of this specification.

In the drawings, Figure 1 is a longitudinal section of a portion of a tire embodying the invention attached to the rim of a wheel.

Fig. 2 is a cross section of the tire and rim.

Fig. 3 is a cross section of the tire detached from the rim and spread open.

Figure 4:
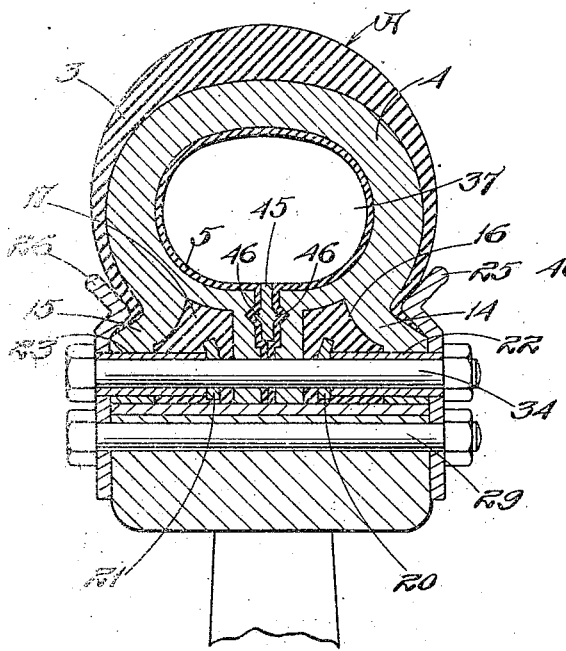
Fig. 4 is a cross section of a modified form of tire embodying the invention attached to a rim.
Figure 5:
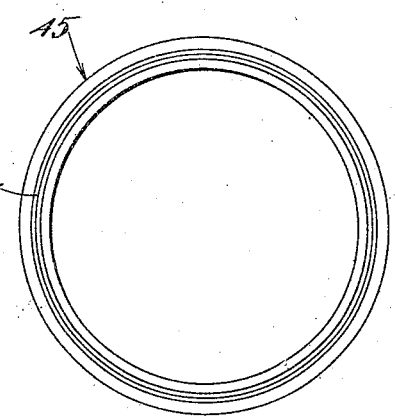
Fig. 5 is a side elevation on a smaller scale of the sealing ring of the tire shown in Fig. 4 detached from the tire.

Referring now to the drawings, 1 represents the felly and 2 the rim, preferably of steel, of the wheel to which the tire is attached.

The tire A is a split tire having preferably an outer or tread portion 3 of rubber, an inner portion 4 of friction canvas, and a lining 5 of soft rubber which is secured to the canvas 4 and forms a permanent part of the tire. The tread portion 3, the canvas portion 4, and the lining 5 are all vulcanized or otherwise secured together so as to form a unit and split on the inner periphery, as clearly shown in Fig. 3 where the tire is shown as spread open. The portions 14, 15 of the tire on opposite sides of the split will be referred to as cheeks. The face of one of the cheek members 15 is formed with a semi-circular groove in which is seated a tubular ring 6 of soft rubber which extends around the entire length of the periphery of the tire and is cemented or otherwise made fast to the bed of the groove 7 in the cheek, the said tube 6 bulging outside of the groove, as shown in Fig. 3.

The face of the other cheek portion 14 of the tire is formed with a semi-circular groove 8 provided with a rubber lining 9, the diameter of the groove 8 being equal to the exterior diameter of the small tube 6 so that when the tire is closed, as in Fig. 2, the projecting half of the tube 6 will be seated in and fill the concave face of the groove 8 while the shoulders 10 and 11 above and below the concave portion of the groove 8 will be seated upon the shoulders 12, 13, respectively which are above and below the tube 6.

Embedded within the cheek portions 14, 15, of the tire are rings or annular blocks 16, 17, of hard rubber which extend around the entire length of the periphery of the tire. Viewed in side elevation they would be annular. These rings or annular blocks of rubber 16, 17 are vulcanized into the canvas.

A series of bolt holes 18, 19, are formed through the cheek members 14, 15 and extend not only through the canvas but also through the rubber rings 16, 17, and are so related to each other that when the tire is brought into the closed position, as in Fig. 2, the bolt holes 18 and 19 will be in alinement with each other. The said bolt holes are each of two diameters, the outer portion being of the larger diameter and the inner end portion of lesser diameter. Steel washers 20, 21 are embedded in the cheek pieces, preferably in the annular rubber blocks 16, 17, at the inner ends of those portions of the bolt holes which are of the larger diameter. Inserted into the larger diameter of the bolt holes are sleeves 22, 23, which are preferably loose therein and are inserted when the bolts are introduced.

The inner ends of the sleeves 22, 23, abut respectively against the washers 20, 21 and the outer ends of the sleeves project some distance beyond the outer faces of the cheek pieces 14, 15.

Side flanges 25, 26, are provided for opposite sides of the tire to aid in clamping the cheek portions of the tire together and in clamping the tire to the rim, said flanges each being annular so as to go against the edges of the rim the entire length thereof on the two sides respectively, each of said flanges being formed with an angular portion 27 which engages in the angular groove 28 formed in the tire. Said flanges are detachable. The flanges 25, 26, and the embraced felly 1 are each formed with a series of bolt holes to receive bolts 29 which pass through said bolt holes and which are formed with a head 30 on one end and are screw-threaded at the other end to receive a nut 31 which may be set up to clamp the flanges firmly to the wheel. Preferably a washer 32 is provided between the nut 31 and the flange 25.

The flanges are also formed with bolt holes 33 in alinement with the bolt holes 18, 19, in the cheek members, said bolt holes being of the same diameter as the larger diameter of the bolt holes in the cheek members and the same diameter as the exterior diameter of the sleeves 22, 23, so that said sleeves will fit into and extend through the said bolt holes 33 in the flanges. Bolts 34 pass through said holes 33 in the flanges and through the sleeves 22, 23, said bolts being formed with a head 35 on one end and being screw-threaded at the other end to receive a nut 36. Preferably there is a washer 37 between the nut and the flange 25 which engages both the flange and the outer end of the sleeve. By setting up the nut 36 the two cheek pieces will be drawn very tightly together, the soft rubber lining formed on each of the contacting edges of the cheek pieces forming a sort of gasket which makes a very tight joint when the nuts 31, 36 are set up.

The felly and rim and cheeks are formed with an aperture extending through to the interior hollow portion 37 of the tire to receive an air tube 38 for the purpose of expanding the tire by connecting an air pump with the nozzle 39 of the air tube, said air tube, of course, to be provided with a valve in the usual manner. This air tube will open into the air tube 6, and the air tube 6 will have an opening 40 leading into the tube 37 so that when the tire is pumped up it will expand the small tube 6 as well as the tire itself. The more it expands the tube 6, the tighter will the tube 6 fit between the cheek pieces in the seat formed for it, therefore making more surely air tight the air space 37 in the tire. As this smaller air tube 6 performs the function of tightly sealing the joint between the two cheek pieces, it will be referred to as the sealing member.

In the modification shown in Fig. 4, there is shown a somewhat different form of sealing member from that already described. The tire in other respects is substantially as already described, but instead of employing the small air tube 6 for the sealing member, there is provided a ring 45 which is clamped between the two adjacent ends of the two cheek pieces. Preferably it is of a width to extend from the interior edge of the lining 5 of the air space 37 for some distance toward the bolt holes in the cheek pieces, and preferably also it is formed with ribs, 46, 46 on its two opposite sides which engage in corresponding grooves in the cheek pieces.

Figure 6:
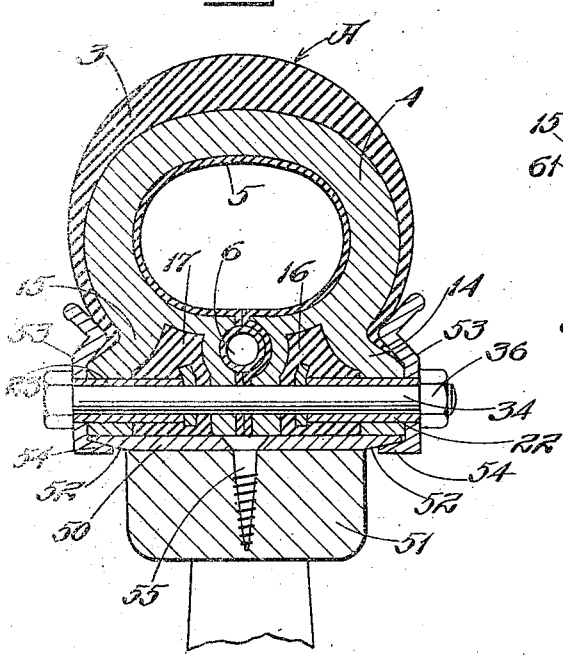
Fig. 6 is a cross sectional view showing a tire of the form shown in Figs. 1, 2 and 3 but with modified form of means for securing the tire to the rim of a wheel.

In the modification shown in Fig. 6 the sealing member is similar to the sealing member first described, consisting of a tube 6, but there is a slight modification in the flanges and in the rim of the felly. In this form the rim 50 is of somewhat greater width than the felly 51, said flange having extension portions which project beyond the edge of the felly on each side. The faces of said extensions which are toward the axis of the wheel are formed with a bevel 52, and the side flange rings 53, 53, are formed with bevel faced lips 54 which engage with the said beveled portions 52 of the rim. The bevel faces form sort of cam surfaces so that when the nuts 36 are set up on the bolts 34, said beveled or cam surfaces will aid in making a tight joint.

In the construction shown in said modification the side flange rings 53 do not embrace the felly and the rim 50 is secured to the felly 51 directly by screws 55.

Figure 7:
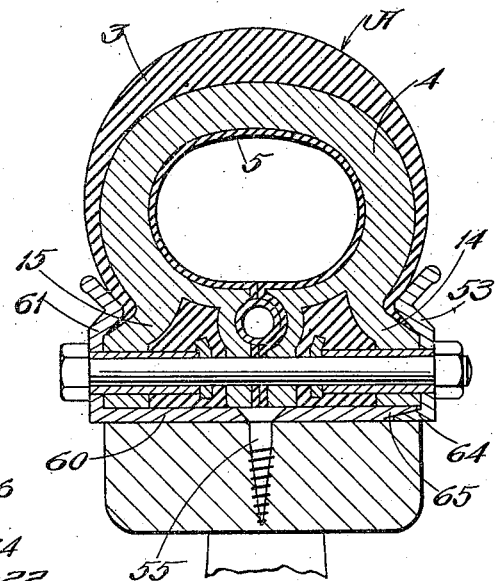
Fig. 7 is a cross section of a tire showing still another modified form of means for securing the tire to the rim.

In the modification shown in Fig. 7 the construction differs from that shown in Fig. 6 mainly in making the rim 60 integral with the flange 61 so that the flange 61 will be non-detachable and it is formed with a beveled faced lip 64 which engages with the bevel face 65 on the rim 60 in a similar manner to the engagement of the bevel face on the lip 54 of the flange 53 with the bevel face 52 on the rim 50, shown and described in connection with the modification in Fig. 6.

A tire constructed in accordance with my invention can be removed and replaced by a new tire whenever it becomes necessary in a very short time by the driver of the car, thus avoiding the delay incident to transportation to a factory and also saving the factory expense. It being an inflatable tubeless tire, there are no inner tubes necessary, thus saving another expense both in the cost of the inner tubes in the first instance, and avoiding the spoiling of inner tubes which sometimes become "pinched" in replacing the burst or punctured inner tubes. The present type of inflatable tires if made sufficiently strong for dray work would require such a heavy construction of the shoe that it would be almost impossible to spring it far enough apart to replace the injured inner tube with a new one without "pinching" it.

If repairs become necessary to the tire embodying my invention, the tire can be sprung wide enough apart to make it accessible for repairs or for any other purpose.

The base of the tire is built up in such a way that it is very firm, overcoming the tendency to creep or slip on the surface of the wheel rim. Such slipping or creeping tends to cause the tire to leak and to become deflated.

The tire is so constructed that it can be inflated in the usual way while it is securely bolted to the wheel.

There being no inner tube, there is no friction to cause the temperature of the confined air in the tire to expand, such expansion causing over strain when the vehicle is heavily loaded and is moving rapidly.

The tire is built up with very strong canvas coated with rubber, the inner surface being coated with rubber of high grade and the outer or tread surface being composed of rubber of the usual kind used in the manufacture of tread face of the tire.

The tire can not only be easily opened and closed for the purpose of removing and replacing the tire on the wheel, but it can be inflated while it is attached to the wheel.

What I claim is:

1. A split inflatable vehicle tire having a tubular inflatable air space therein, the two adjacent faces of the cheek members being each formed with a V-shaped groove extending the entire circuit of the said cheek intermediate the inner and outer periphery thereof, a sealing ring between the cheek members, said ring having on one face thereof a rib portion which fits the groove in one of the cheek members and having flat portions which overlie the face of the cheek on each side of the groove, the said ring having on its other face another rib portion which is adapted to engage with the groove in the face of the other cheek member when the two cheek members are brought together, and having flat portions in each side of the rib to engage the flat face of the cheek members, and means for clamping the two cheek members together.

2. A split inflatable vehicle tire having an inflatable air space therein, a sealing member between the two adjacent faces of the cheek members, the cheek members being formed with a series of bolt holes so disposed that the bolt holes in each cheek member will be in alinement with the bolt holes in the other cheek member when the tire is closed, washers embedded in the cheek members each having apertures in alinement with the bolt holes, said bolt holes being of two diameters, the outer portions being of the larger diameter, sleeves inserted into said enlarged portions of the bolt holes and extending from the washers outwardly beyond the outer faces of the cheek pieces, flanges which fit over the projecting ends of the sleeves, and bolts which pass through said bolt holes and sleeves, the said bolts being provided with clamping nuts whereby the flanges are drawn up against the tire, and the cheek members and sealing member are brought into tight clamping position.

3. A split inflatable vehicle tire having a tubular air space therein, the cheek members which form the abutting portions on the two sides of the split each having a body portion of canvas and having embedded therein a ring of relatively hard rubber which extends the entire length of the tire, the cheek members being formed with a series of bolt holes which pass transversely through said rubber ring, the bolt holes of the two cheek members being in alinement with each other when the tire is closed, washers embedded in each ring concentric with the bolt holes and sleeves inserted into the outer ends of the bolt holes, the inner ends of said sleeves abutting against the said washers.

4. A split inflatable vehicle tire having a tubular air space therein, the cheek members which form the abutting portions on the two sides of the split each having a body portion of canvas and having embedded therein a ring of relatively hard rubber which extends the entire length of the tire, the cheek members being formed with a series of bolt holes which pass transversely through said rubber ring, the bolt holes of the two cheek members being in alinement with each other when the tire is closed, washers embedded in each ring concentric with the bolt holes, sleeves inserted into the outer ends of the bolt holes, the inner ends of said sleeves abutting against the said washers, flanges which engage the outer faces of the cheek members, said flanges being formed with bolt holes corresponding with the bolt holes in the cheek portions of the tire, bolts which pass through said bolt holes, and means for setting up said bolts to clamp the flanges against the outer faces of the cheek members and to clamp the inner faces of the cheek members together.

5. A split inflatable vehicle tire having a tubular air space therein, the cheek members which form the abutting portions of the tire each having embedded therein a ring of relatively hard rubber which extends the entire length of the tire, the cheek members being formed with a series of bolt holes which pass transversely through said rubber ring, the bolt holes of the two cheek members being in alinement with each other when the tire is closed, washers embedded in each ring concentric with the bolt holes and sleeves inserted into the outer ends of the bolt holes, the inner ends of said sleeves abutting against the said washers.

In testimony whereof I affix my signature.

FRANKLIN G. SAYLOR.